No. 748,808. PATENTED JAN. 5, 1904.
A. SPRATT.
PIPE JOINT OR COUPLING.
APPLICATION FILED APR. 13, 1901.
NO MODEL.
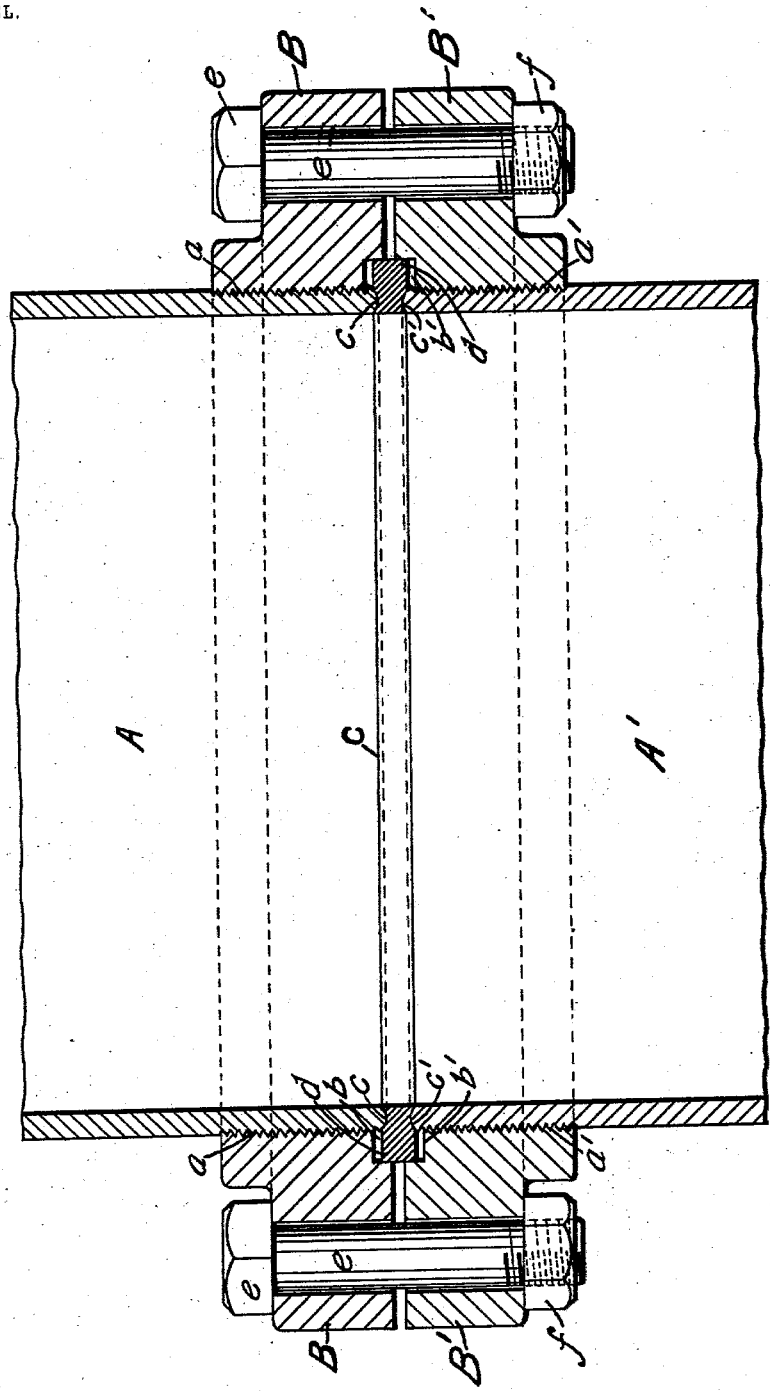
WITNESSES,
James H. Thurston
Catherine G. Bradley
INVENTOR,
Albert Spratt,
BY Wilmarth H. Thurston
ATT'Y.
THE NORRIS PETERS CO., PHOTO-LITHO., WASHINGTON, D. C.

No. 748,808. Patented January 5, 1904.

UNITED STATES PATENT OFFICE.

ALBERT SPRATT, OF PROVIDENCE, RHODE ISLAND, ASSIGNOR TO GENERAL FIRE EXTINGUISHER COMPANY, OF NEW YORK, N. Y., A CORPORATION OF NEW YORK.

PIPE JOINT OR COUPLING.

SPECIFICATION forming part of Letters Patent No. 748,808, dated January 5, 1904.

Application filed April 13, 1901. Serial No. 55,672. (No model.)

*To all whom it may concern:*

Be it known that I, ALBERT SPRATT, of the city and county of Providence and State of Rhode Island, have invented certain new and useful Improvements in Pipe Joints or Couplings; and I do hereby declare the following specification, taken in connection with the accompanying drawing, forming a part of the same, to be a full, clear, and exact description thereof.

The invention relates to a joint or coupling for metal pipes for conducting steam, water, or other fluid, and is especially adapted for use on pipes of a large size which are to be subjected to a high pressure.

The object of the present invention is to provide a simple form of coupling which will be cheap to construct, easy to connect, and when connected will form a perfectly tight joint, which will withstand great pressure.

To this end the invention consists in the novel construction, arrangement, and combination of parts, which will be hereinafter fully described, reference being had to the accompanying drawing, which is a longitudinal section of my improved pipe-coupling.

Referring to the drawing, A A' represent portions of two lengths or sections of pipe having the exterior threaded surfaces $a$ $a'$ at or near their ends. Upon the ends of each pipe are screwed the flanged collars B B', which are provided with annular recesses $b$ $b'$ on the inside edges of their adjacent faces. A hard-metal ring C is interposed between the ends of the pipes and is provided with the annular grooves $c$ $c'$ on its opposite faces, which form seats for the respective ends of the pipes. The ends of the pipes and the grooves in the metal ring are machine-made to form a perfect joint. With this construction it is unnecessary to have a tight joint between the collar and the pipe at the screw-threads, and consequently the pipe and collar need not be tapered, but may be made straight, and the necessity of having a perfect screw-thread is obviated. By leaving the pipe straight it will be observed that a greater area of contact will be furnished at the end of the pipe, at the same time preserving the full strength of the metal, and this area is still further increased by rounding the end of the pipe and the groove in the metal ring, as shown in the drawing. The metal ring C is also provided with an outward extension $d$, which fits in the recesses $b$ $b'$ and serves as a guide in connection with said recesses to guide the ends of the pipe to their seats in the ring. Said extension also serves to take any lateral thrust or strain and materially strengthens the joint against sagging or distortion. The ends of the pipes are drawn toward each other and against the seats in the interposed ring by means of the bolts $e$ and nuts $f$, said bolts passing through holes formed in the flanges of the collars.

With the above construction it will be observed that the tight joints between the ends of the pipes and the interposed ring protect both the joints between the pipes and the flanged collars and also the joint between the flanges themselves. It will be further observed that the joints between the ends of the pipes and the ring are tightened entirely by the clamping-bolts and that no other tightening operation is required.

What I claim as my invention, and desire to secure by Letters Patent, is—

1. In a pipe-coupling the combination, with hard-metal pipes of a hard-metal ring interposed between the ends of the pipes and means for holding the ends of the pipes in contact with said ring, the abutting surfaces of the pipes and ring being finished to make a tight joint.

2. In a pipe-coupling the combination, with hard-metal pipes, of a hard-metal ring having annular grooves in its opposite faces and means for holding the ends of the pipes in said grooves the abutting surfaces of the pipes and ring being finished to make a tight joint.

3. In a pipe-coupling the combination, with hard-metal pipes, of flanged collars secured thereto and provided with recesses, a hard-metal ring provided with an outward extension adapted to enter said recesses and means for holding the ends of said pipes seated against said ring.

4. In a pipe-coupling the combination, with hard-metal pipes of flanged collars secured thereto provided with recesses on the inside edges of their adjacent faces, a hard-metal ring provided with an outward extension adapted to enter the recesses in the collars and means for drawing and holding the ends of said pipes seated against said ring.

5. In a pipe-coupling the combination, with hard-metal pipes, of flanged collars secured thereto and provided with recesses on the inside edges of their adjacent faces, a hard-metal ring having annular grooves in its opposite faces and an outward extension adapted to enter the recesses in the collars, and means for drawing and holding the ends of the pipes seated in the annular grooves in said ring.

6. In a pipe-coupling the combination, with the exterior threaded pipes having the ends rounded, of a metal ring provided on its opposite faces with corresponding annular grooves adapted to receive the ends of the pipes and with an outward extension, interiorly-threaded flanged collars secured to said pipes and provided with recesses in their adjacent faces adapted to receive the outward extension of the metal ring and means for forcing the ends of the pipes against the interposed ring.

ALBERT SPRATT.

Witnesses:
CHARLES W. SPRATT,
JAMES H. THURSTON.